United States Patent [19]
Lin et al.

[11] Patent Number: 5,667,660
[45] Date of Patent: Sep. 16, 1997

[54] SYNTHESIS OF CHARGED $Li_xCoO_2$ ($0<x<1$) FOR PRIMARY AND SECONDARY BATTERIES

[75] Inventors: Hsiu-Ping W. Lin, Princeton, N.J.; Kevin Burgess, Horsham, Pa.

[73] Assignee: Alliant Techsystems Inc., Hopkins, Minn.

[21] Appl. No.: 527,208

[22] Filed: Sep. 12, 1995

[51] Int. Cl.[6] ................................................ H01M 4/04
[52] U.S. Cl. .................................... 205/59; 429/218
[58] Field of Search ............... 205/59; 429/218; 427/201, 126.6

[56] References Cited

U.S. PATENT DOCUMENTS

| | | | |
|---|---|---|---|
| 4,497,726 | 2/1985 | Brule et al. | 252/182.1 |
| 4,804,596 | 2/1989 | Ebner et al. | 429/194 |
| 4,818,647 | 4/1989 | Plichta et al. | 429/218 |
| 5,110,696 | 5/1992 | Shokoohi et al. | 429/218 |
| 5,296,319 | 3/1994 | Bito et al. | 429/218 X |
| 5,427,875 | 6/1995 | Yamamoto et al. | 429/218 X |

OTHER PUBLICATIONS

Gummow et al., "Characterization of $LT-Li_xCo_{1-y}Ni_yO_2$ Electrodes for Rechargeable Lithium Cells", J. Electrochem. Soc., vol. 140, No. 12, Dec. 1993, pp. 3365–3368.

*Primary Examiner*—Stephen Kalafut
*Attorney, Agent, or Firm*—Haugen and Nikolai, P.A.

[57] ABSTRACT

A method for producing stable pre-charged $Li_xCoO_2$ as the cathode active metal in primary or secondary active metal non-aqueous cells and cells using such material are disclosed.

13 Claims, 5 Drawing Sheets

SYNTHESIS OF CHARGED $Li_xCoO_2$ (0<x<1) FOR PRIMARY AND SECONDARY BATTERIES

BACKGROUND OF THE INVENTION

The Government has certain rights in this application pursuant to Contract N60921-93-C-0060 with the Department of the Navy.

1. Field of the Invention

The present invention is directed generally to the field of high energy, non-aqueous electrochemical cells and, more particularly, to improvements in such cells employing $Li_xCoO_2$ cathode material which enable the cathode material to be synthesized in a pre-charged state prior to incorporation in the cell.

2. Related Art

Non-aqueous, active metal cells have become well known for achieving very high energy densities or energy to weight ratios, i.e., higher than was previously known with other types of electrochemical cells. Active metal cells typically consist of a light, strongly reducing anode, normally of an alkali metal such as lithium (an aprotic, non-aqueous solvent into which an appropriate quantity of the salt of the anode metal has been dissolved to form a conductive solution, and an oxidizing agent as the cathode material. Such cells can be in the form of primary or secondary (rechargeable) cells.

It is further known to employ the material $Li_xCoO_2$ (0<x<1) as the active cathode material of such cells. For example, its use is disclosed in U.S. Pat. No. 4,497,726 and further discussed in Mizushima, K. et al, "$Li_xCoO_2$ (0<x<1): A New Cathode Material for Batteries of High Energy Density," Mat. Res. Bull., Vol. 15, 783 (1980). A lithium non-aqueous secondary electrochemical cell having an ester-based organic electrolyte solution and a cathode active material comprising $Li_xCoO_2$ (0<X<1) is illustrated and described in U.S. Pat. No. 4,804,596 to Walter B. Ebner and Hsiu-Ping W. Lin (an inventor in the present application) which is also assigned to the same assignee as the present application. That reference describes the use of $Li_xCoO_2$ as the active cathode material in a cell in combination with an ester-based electrolyte solution that can withstand the high operating and charging potentials characteristic of that system. The $Li_xCoO_2$ cathode material in that system, however, must be incorporated in the discharged state and thereafter charged. Furthermore, because of corrosion problems in stainless steel, an aluminum grid is required to withstand the initial charging voltage.

Lithium-cobalt oxide ($LiCoO_2$) and lithium-cobalt-nickel oxides ($LiCo_{1-y}Ni_yO_2$) (0≤y≤1) are described for use as electrodes for rechargeable lithium cells by R. J. Gummow and M. M. Thackeray in "Characterization of LT-$Li_xCo_{1-y}Ni_yO_2$ Electrodes for Rechargeable Lithium Cells", J. Electrochem. Soc., Vol. 140, No. 12, December (1993). They describe the use of acid leaching to improve the recycling properties of certain materials. Data supplied in the reference for the charge/discharge profiles of acid leached LT (Low Temperature) $LiCoO_2$, however, shows achievement of only about 63 mAh/g for the first discharge and this degrades quickly to <20 mAh/g in only four cycles. Certain Ni doped Li/LT-LiCoNiO$_2$ cells assembled in a charged state were found to be significantly more cycle tolerant. However, success was limited to Ni doped materials.

Thus, $Li_xCoO_2$ heretofore has been available for incorporation as a successful cathode material only in a fully discharged state because $Li_xCoO_2$ as it is known to exist in the charged state is not stable with respect to elevated temperatures normally required in the manufacturing environment. The batteries have, therefore, been assembled in the discharged state and charged prior to first use. The charging process has certain drawbacks. It results in the plating of an amount of lithium from the cathode onto the anode, and batteries have had to be designed to accommodate the extra lithium plated out of the cathodes during the initial charging after assembly; otherwise, internal shorting of the battery could be a problem. Also, the high voltage required to the initial charging of the battery has required the cathode collector to be made from aluminum rather than the preferred material, stainless steel. Other approaches have been tried to improve the cycle efficiency of $Li_xCoO_2$. Electrochemical titration has been used on pre-fabricated cathodes to obtain charged $Li_xCoO_2$ material. However, this process has been used with limited success as it produces only limited quantities of charged material and the final products have to be determined by the pre-fabricated shapes and compositions.

Accordingly, it is a primary object of the present invention to provide a synthesis for charged $Li_xCoO_2$ (0<X<1) suitable for use as the cathode active material in primary and secondary battery applications.

It is a further object of the present invention to provide a synthesis for charged $Li_xCoO_2$ (0<X<1) for primary and secondary cell applications in which the charged material is in a stable powdered form which can than be shaped and incorporated in any composition of cathode desired.

Other objects and advantages with respect to the present invention will occur to those skilled in the art through familiarity with the specification and claims herein.

SUMMARY OF THE INVENTION

The present invention provides a new cathode process in which charged $Li_xCoO_2$ cathodes can be manufactured in an efficient and cost-effective manner. The product is superior to acid-treated embodiments, delivering twice the capacity of those materials with improved cycling efficiency. The positive current collector for the cathode is not limited to aluminum. It may be stainless steel. The present invention provides a process to manufacture charged $Li_xCoO_2$, preferably where 0≤x≤0.5, in a powdered form for use as a raw material in the subsequent manufacture of cathodes. The powdered form can be combined in any desired cathode composition and worked into any configuration or shape.

In the preferred process, pure $LiCoO_2$ commercially obtainable from FMC Corporation, for example, is used as the starting material. A small amount of solvent, for example, methyl formate (MF) is added to the $LiCoO_2$ powder to wet the powder and to form a wet slurry or paste. The material is then formed as a layer on a pre-cut metal grid, preferably of aluminum, and suitably provided with an electrical lead, and the surface thereafter smoothed. The pasted material is then sealed inside microporous separators which may be a polyethylene envelope which is itself thereafter sandwiched between two sections of lithium anode of approximately the same dimensions also provided with electrical connections. The three-plate stack which itself forms a large lithium cell is then confined in an alluminated trilaminated envelope with anode and cathode leads protruding out from the envelope. Next, electrolyte is injected into the bag and the large cell charged. After charging the desired amount, the cell is opened in a dry room and the cathode envelope opened and the material rinsed with solvent and vacuum dried.

The charged $Li_xCoO_2$ powder is now ready to be removed from the original aluminum charging grid and utilized in a cathode mixture in any manner desired. The value of x can be controlled by the amount of coulombic titration, and is preferably less than about 0.5.

The charged material is still in powdered form and can be used as raw cathode material for any batteries. The material is normally mixed with a conductive diluent such as carbon or graphite in a binder such as polytetrafluoroethylene (PTFE) and the cells can be used for primary or secondary applications without initial charging.

DETAILED DESCRIPTION

The present invention enables the advantages associated with the unusually high energy density of $Li_xCoO_2$ cathode material to be incorporated in a pre-charged state by subjecting it to a pre-charging process prior to incorporation in the cathode mixture. The process makes use of $Li_xCoO_2$ in the uncharged state and transforms it into a pre-charged $Li_xCoO_2$ (0<x<1) powdered raw cathode material for incorporation in a cathode mix suitable for any battery, primary, secondary, etc. in which such cathode material is desired. As a powder, the material can be worked into any shape or mixture combination required.

Figure 5:
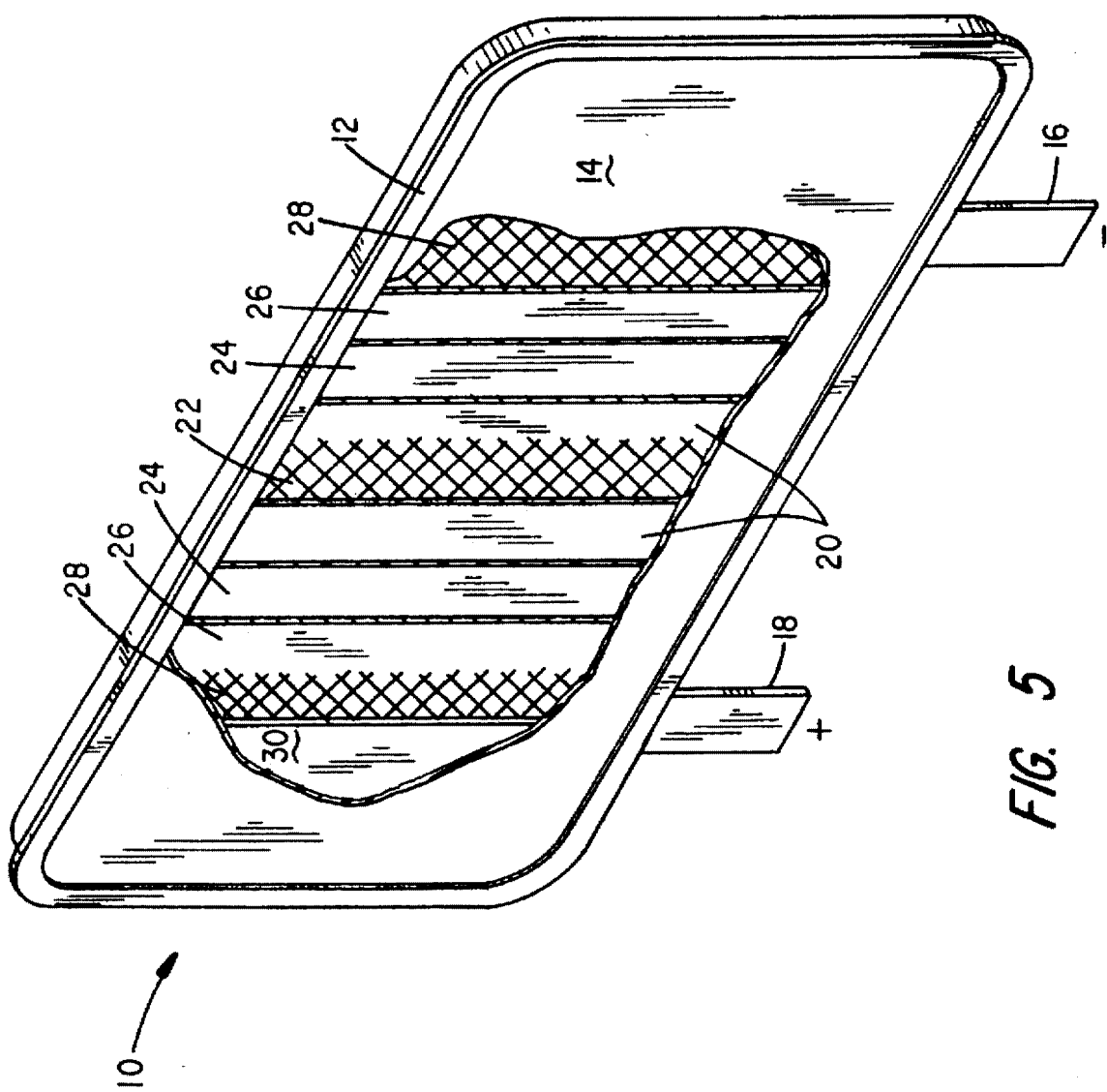
FIG. 5 is a perspective schematic view with parts broken away of a charging system for producing pre-charged $Li_x$-$CoO_2$ in accordance with the invention.

A system for pre-charging the $LiCoO_2$ powder for use as the cathode active material according to the invention is depicted in FIG. 5. The charging system generally takes the form of a rather large lithium cell shown generally at 10 and includes a metallic retaining shell having a retaining rim as shown at 12 which may be stainless steel and which further supports a metallized plastic bag 14, preferably a trilaminated envelope having an aluminized inner surface (not shown). Protruding anode and cathode leads shown respectively at 16 and 18 are designed for external connection to a source of charging voltage. The $LiCoO_2$ 20 is pressed onto both sides of the metallic grid, preferably aluminum, 22. Grid 22 which with a pair of semipermeable microporous polymer separators 24 is sandwiched between a pair of lithium anodes 26 with metallic, preferably nickel, current collectors 28. This forms what is known as a three-plate stack cell with the cathode material sandwiched between a pair of large area anodes. This may be covered by a layer of material such as Tefzel 30 within the trilaminated metallized envelope 14.

In the preferred embodiment of the process, finely divided $LiCoO_2$ powder, approximately −325 mesh, obtained in a substantially pure form from FMC Corporation, is combined with a small amount of solvent, such as methyl formate (MF), to form a heavy slurry or paste. The paste is then spread onto both sides of the pre-cut metallic grid 22 which is of a metal which can withstand the required charging voltage without corroding, such as aluminum. The thickness of the paste is typically 0.25" and that of the grid is 0.01". The surface of the paste may be made generally smooth using a stainless steel plate, or the like. The pasted material is then sealed inside separators 24 which may each be a layer of microporous polymer material, normally a polyethylene envelope, represented by separators which itself is thereafter sandwiched between the pair of lithium anodes 26 with nickel grids 28. This sandwich or three-plate stack is thereafter confined inside the metallized (aluminized) trilaminated envelope (which may be polyethylene terephthalate). An electrolyte material is then injected into the bag to activate the cell. The electrolyte is preferably a 2 molar double salt methyl formate ($LiAsF_6$+$LiBF_y$) system but any suitable material including methyl acetate may be employed. The cell is typically charged at a potential of 4.3 volts. After charging, one trilaminated envelope was opened in a dry room and the internal cathode envelope cut open and the material rinsed with solvent and vacuum dried. The result was a charged $Li_xCoO_2$ powder in ready-to-use form in which the value of x can be controlled by the amount of coulombic titration and is preferably less than 0.5.

The typical grid size used experimentally has been about 9 cm by 19 cm which can process about 100 grams of $LiCoO_2$. This is enough material for about 25 size "AA" rechargeable $Li_{0.5}CoO_2$ cells. The system works well for fairly high production rates. The normal charging voltage is about 4.3V and about 5 mA of current. The metallized trilaminate envelope may be any compatible gas-tight system which is easy to apply and remove in the process.

As can be seen from the above, the construction of the cell charging system is simple and inexpensive and the charged material requires no special handling. Desired quantities of conductive diluent, such as carbon or graphite, and binder, such as polytetrafluoroethylene (PTFE), can be added and the material processed into the finished cathode. Such cathodes, of course, can be used for primary or secondary applications without the initial charging $LiCoO_2$ requires.

Figure 1:
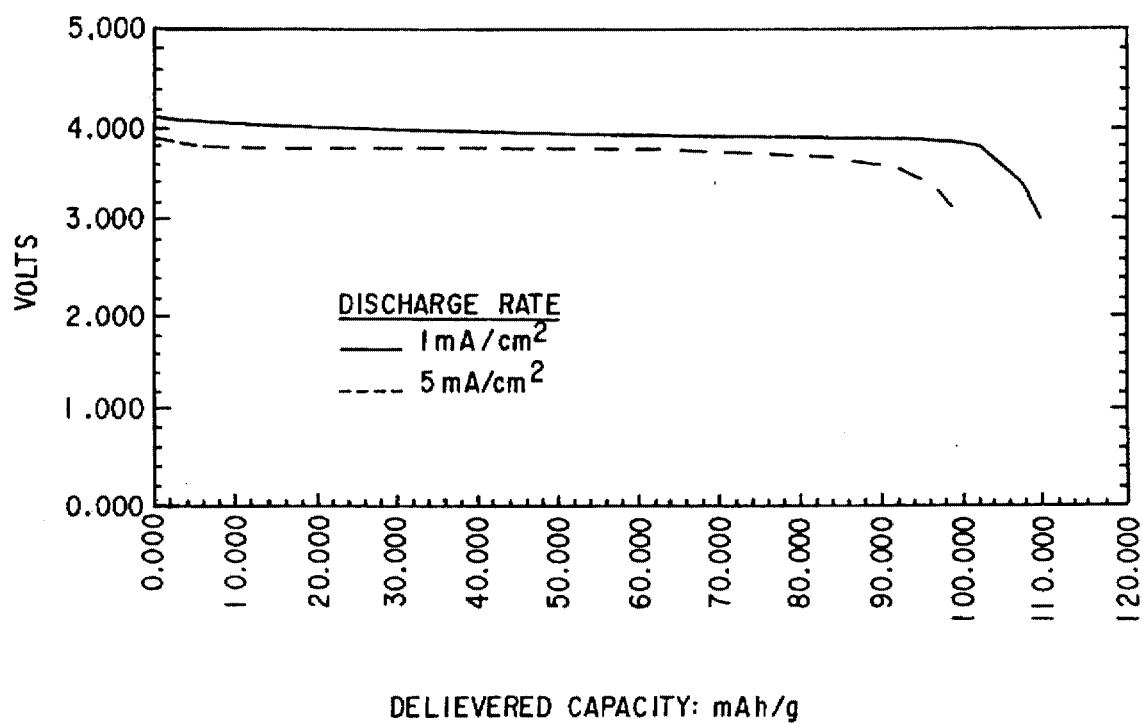
FIG. 1 represents the discharge performance of cells using the pre-charged $Li_{0.5}CoO_2$ cathodes in accordance with the invention at two discharge rates, 1 and 5 $mA/cm^2$.
Figure 2:
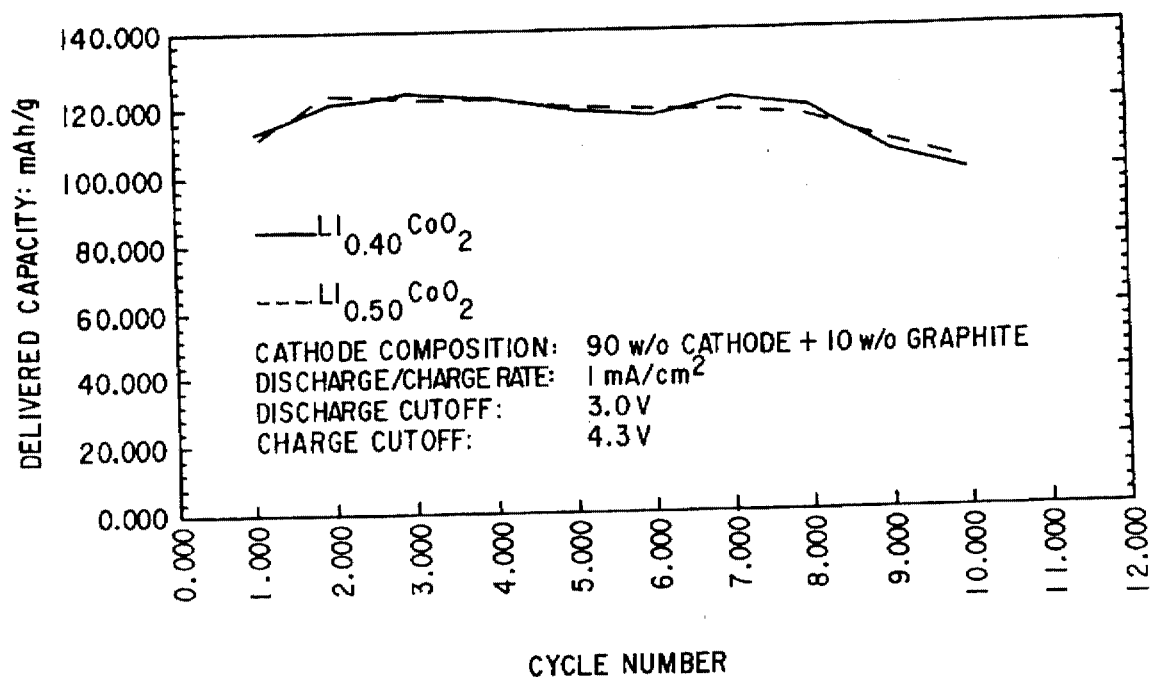
FIG. 2 is a graphical representation of cycle performance of pre-charged $Li_{0.5}CoO_2$ cells over ten cycles.

The discharge performance of pre-charged $Li_{0.5}CoO_2$ cathodes is depicted in FIG. 1 for the discharge rates of 1 and 5 $mA/cm^2$. In addition, the delivered capacity, which was 113 mAh/g based on total cathode weight, is quite comparable to the typical delivered capacity of approximately 120 mAh/g $LiCoO_2$ after charging a cell manufactured in the discharge state. FIG. 2 confirms that the material is cyclable and so suitable for use in secondary cells.

Figure 3:
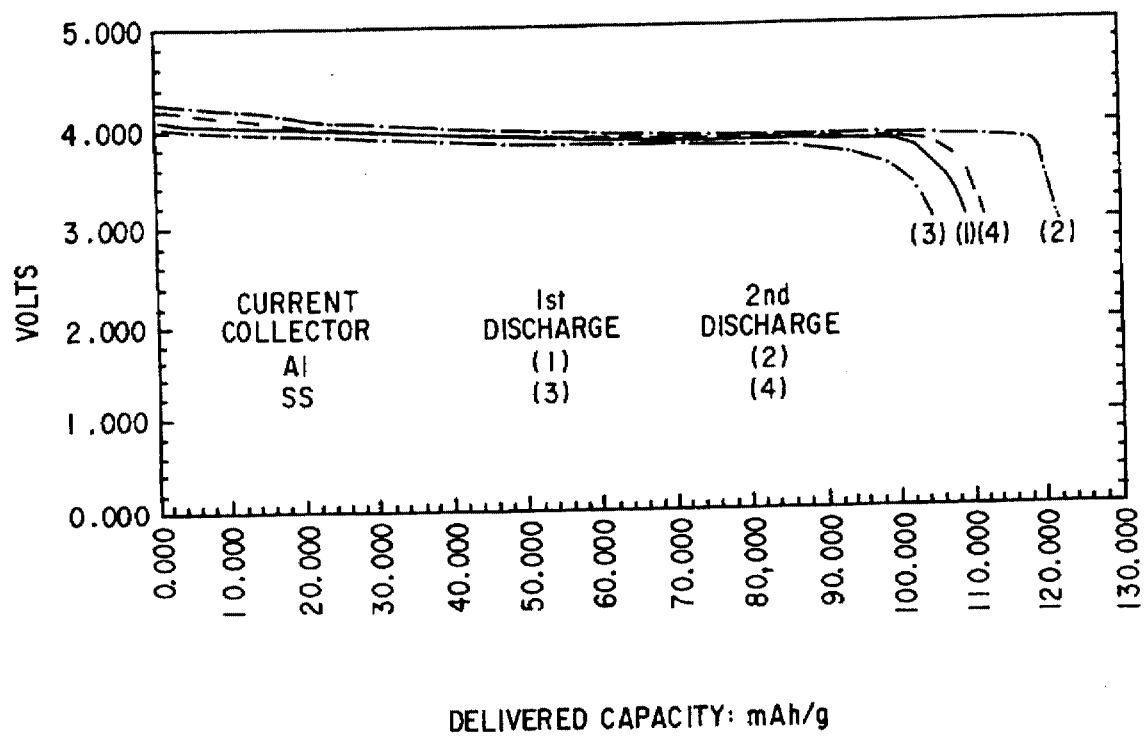
FIG. 3 is a discharge plot of pre-charged $Li_{0.5}CoO_2$ cells at 1 $mA/cm^2$ rate comparing aluminum and stainless steel current collectors.
Figure 4:
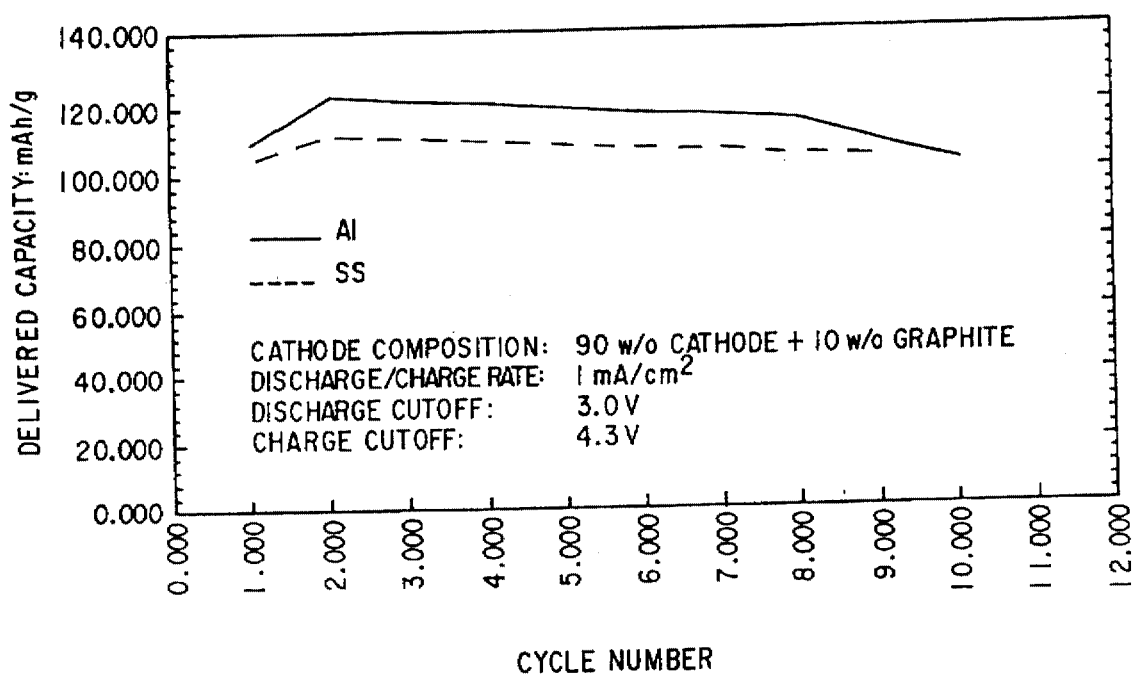
FIG. 4 shows cycle performance of pre-charged $Li_{0.5}CoO_2$ cathode cells over ten cycles comparing aluminum and stainless steel current collectors.

The materials as processed in accordance with the present invention represent a drastic improvement over the acid leached materials previously known and are comparable to materials utilized in the cells previously assembled in the uncharged state. In addition, the positive current collector material for the cathode need not be limited to aluminum in the case of the pre-charged material and can be made from stainless steel or other materials. It had previously been found that stainless steel corroded because of the high required charging voltages in cells built with the discharged $LiCoO_2$ cathodes. FIGS. 3 and 4 compare cells utilizing aluminum and stainless steel positive current collectors. FIG. 3 depicts discharge performance of pre-charged $Li_{0.5}CoO_2$ at 1 $mA/cm^2$ during four discharge cycles. The Figure shows that results are comparable using either material as the positive current collector. FIG. 4 makes a similar comparison for secondary cell cycling and indicates that either material would also be satisfactory in this respect.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

We claim:

1. A method of preparing a cathode incorporating heat stabilized charged $Li_xCoO_2$ as the cathode active material comprising the steps of:

(a) preparing the cathode active material by;
        (1) providing a layer of particulate $Li_xCoO_2$ on a metallic current collector,
        (2) subjecting the $Li_xCoO_2$ on said current collector to a charging current voltage to plate out Li and produce charged $Li_xCoO_2$ ($0<x<1$), and
        (3) separating the charged particulate material from said current collector; and (b) incorporating said particulate cathode active material in the cathode.

2. The method of claim 1 wherein ($0<x\leq 0.5$) after charging.

3. The method of claim 1 wherein the charging voltage is from about 4.2 to about 4.3 volts.

4. The method of claim 1 wherein said current collector is aluminum.

5. The method of claim 1 wherein said charged particulate material is combined with quantities of a conductive diluent material.

6. The method of claim 5 wherein said diluent material is a form of carbon.

7. The method of claim 5 further comprising the step of combining said charged particulate material with a binder.

8. The method of claim 6 wherein said charged particulate material is further applied to a stainless steel current collector material.

9. The method of claim 7 wherein said charged particulate material is further applied to a stainless steel current collector material.

10. A method of preparing a cathode containing heat stabilized, charged $Li_xCoO_2$ ($0<x<1$) as the active material comprising the steps of:

(a) preparing the active material by;
        (1) creating a layer of powdered $Li_xCoO_2$ from a solvent slurry thereof on a metallic collector grid,
        (2) sandwiching the collector grid between a pair of lithium members separated by semipermeable separator membranes to form a three-plate stack,
        (3) confining the three-plate stack cell in a gas-tight environment,
        (4) providing electrolyte to the three-plate stack;
        (5) charging the cell using externally supplied power until an amount of charge corresponding to a value of x, where $0<x<1$ is achieved, and
        (6) separating the charged particulate material from said collector grid; and (b) combining said separated charged particulate $Li_xCoO_2$ material into a cathode mix for application to a current collector for use in a non-aqueous electrochemical cell.

11. The method of claim 10 wherein the gas-tight environment is a metallized coated polymer envelope.

12. The method of claim 10 wherein the metallic collector grid is aluminum.

13. The method of claim 10 where $x\leq 0.5$ after charging.

* * * * *